(12) United States Patent
Ng

(10) Patent No.: US 10,194,185 B2
(45) Date of Patent: Jan. 29, 2019

(54) SYSTEMS AND METHODS FOR COMMUNICATING TIME REPRESENTATIONS

(71) Applicant: Sharp Kabushiki Kaisha, Sakai, Osaka (JP)

(72) Inventor: Sheau Ng, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/745,721

(22) PCT Filed: Aug. 10, 2016

(86) PCT No.: PCT/JP2016/003703
§ 371 (c)(1),
(2) Date: Jan. 18, 2018

(87) PCT Pub. No.: WO2017/029794
PCT Pub. Date: Feb. 23, 2017

(65) Prior Publication Data
US 2018/0213270 A1    Jul. 26, 2018

Related U.S. Application Data

(60) Provisional application No. 62/210,859, filed on Aug. 27, 2015, provisional application No. 62/205,564, filed on Aug. 14, 2015.

(51) Int. Cl.
*H04N 21/242* (2011.01)
*H04H 60/40* (2008.01)
*H04N 21/2383* (2011.01)
*H04N 21/43* (2011.01)
*H04N 21/438* (2011.01)

(52) U.S. Cl.
CPC .......... *H04N 21/242* (2013.01); *H04H 60/40* (2013.01); *H04N 21/2383* (2013.01); *H04N 21/4305* (2013.01); *H04N 21/4382* (2013.01)

(58) Field of Classification Search
CPC ............. H04N 21/2383; H04N 21/242; H04N 21/4305; H04N 21/4382
See application file for complete search history.

(56) References Cited

U.S. PATENT DOCUMENTS

2008/0211969 A1* 9/2008 Simon .................... H04H 20/18
                                                                                         348/725
2011/0086662 A1* 4/2011 Fong .................. H04W 72/0406
                                                                                         455/517
2018/0124451 A1* 5/2018 Takahashi ............ H04N 21/434

OTHER PUBLICATIONS

Advanced Television Systems Committee, "ATSC Standard: A/107—ATSC 2.0 Standard", Jun. 15, 2015, 23 pages.

* cited by examiner

*Primary Examiner* — Nicholas T Corbo
(74) *Attorney, Agent, or Firm* — Keating & Bennett, LLP

(57) ABSTRACT

A device may be configured to signal system time using partial time values. Partial time values may be included in a physical frame preamble. Partial time values may be transmitted according to a specified interval.

20 Claims, 11 Drawing Sheets

SYSTEMS AND METHODS FOR COMMUNICATING TIME REPRESENTATIONS

TECHNICAL FIELD

The present disclosure relates to the field of interactive television.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio programming) may originate from a plurality of sources including, for example, over-the-air television providers, satellite television providers, cable television providers, online media service providers, including, so-called streaming service providers, and the like. Digital media content may be transmitted from a source (e.g., an over-the-air television provider) to a receiver device (e.g., a digital television) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 2.0 standard. The ATSC is currently developing the so-called ATSC 3.0 standard.

During the transmission of digital media content and associated data from a source to a receiver device and the rendering of digital media at the receiver device one or more time synchronizations may occur. In some cases it may be useful for a receiver device to derive system time from a source. In some examples, system time may refer to a time value representing the current date and time of day. Current techniques for communicating time information between a source and a receiver device may be less than ideal.

SUMMARY OF INVENTION

In general, this disclosure describes techniques for communicating time information. In particular, this disclosure describes techniques for communicating time information using partial time values, where each partial time value (PTV) may be communicated at different intervals and/or at different layers of a communications protocol stack model. It should be noted that when communicating time representations to receiver devices there is typically a trade-off between robustness/reliability and data capacity of a transmission channel. For example, transmitting a detailed time value (e.g., an 80-bit time value) in every packet header may provide for a high-level of precision, but requires a relatively large data capacity. The techniques described herein provide efficient ways to transmit time representations in a reliable manner. It should be noted that although in some examples the techniques of this disclosure are described with respect to ATSC standards, the techniques described herein are generally applicable to any transmission standard. For example, the techniques described herein are generally applicable to any of DVB standards, ISDB standards, ATSC standards, Digital Terrestrial Multimedia Broadcast (DTMB) standards, Digital Multimedia Broadcast (DMB) standards, Hybrid Broadcast and Broadband (HbbTV) standard, World Wide Web Consortium (W3C) standards, and Universal Plug and Play (UPnP) standards. Further, the techniques described herein may be applicable and useful for communicating time information regardless of how digital multimedia is provided to a receiver device.

According to one example of the disclosure, a method of signaling a system time comprises signaling a first partial time value indicating a time at a mark associated with a physical layer frame, and signaling one of a second partial time value indicating a time at a mark associated with a physical layer frame or a third partial time value indicating a time at a mark associated with a physical layer frame.

According to another example of the disclosure, a device for signaling a system time comprises one or more processors configured to signal a first partial time value indicating a time at a mark associated with a physical layer frame, and signal one of a second partial time value indicating a time at a mark associated with a physical layer frame or a third partial time value indicating a time at a mark associated with a physical layer frame.

According to another example of the disclosure, an apparatus for signaling a system time comprises means for signaling a first partial time value indicating a time at a mark associated with a physical layer frame, and means for signaling one of a second partial time value indicating a time at a mark associated with a physical layer frame or a third partial time value indicating a time at a mark associated with a physical layer frame.

According to another example of the disclosure, a non-transitory computer-readable storage medium comprises instructions stored thereon that upon execution cause one or more processors of a device to signaling a first partial time value indicating a time at a mark associated with a physical layer frame, and signaling one of a second partial time value indicating a time at a mark associated with a physical layer frame or a third partial time value indicating a time at a mark associated with a physical layer frame.

The details of one or more examples are set forth in the accompanying drawings and the description below. Other features, objects, and advantages will be apparent from the description and drawings, and from the claims.

DESCRIPTION OF EMBODIMENTS

Figure 1:
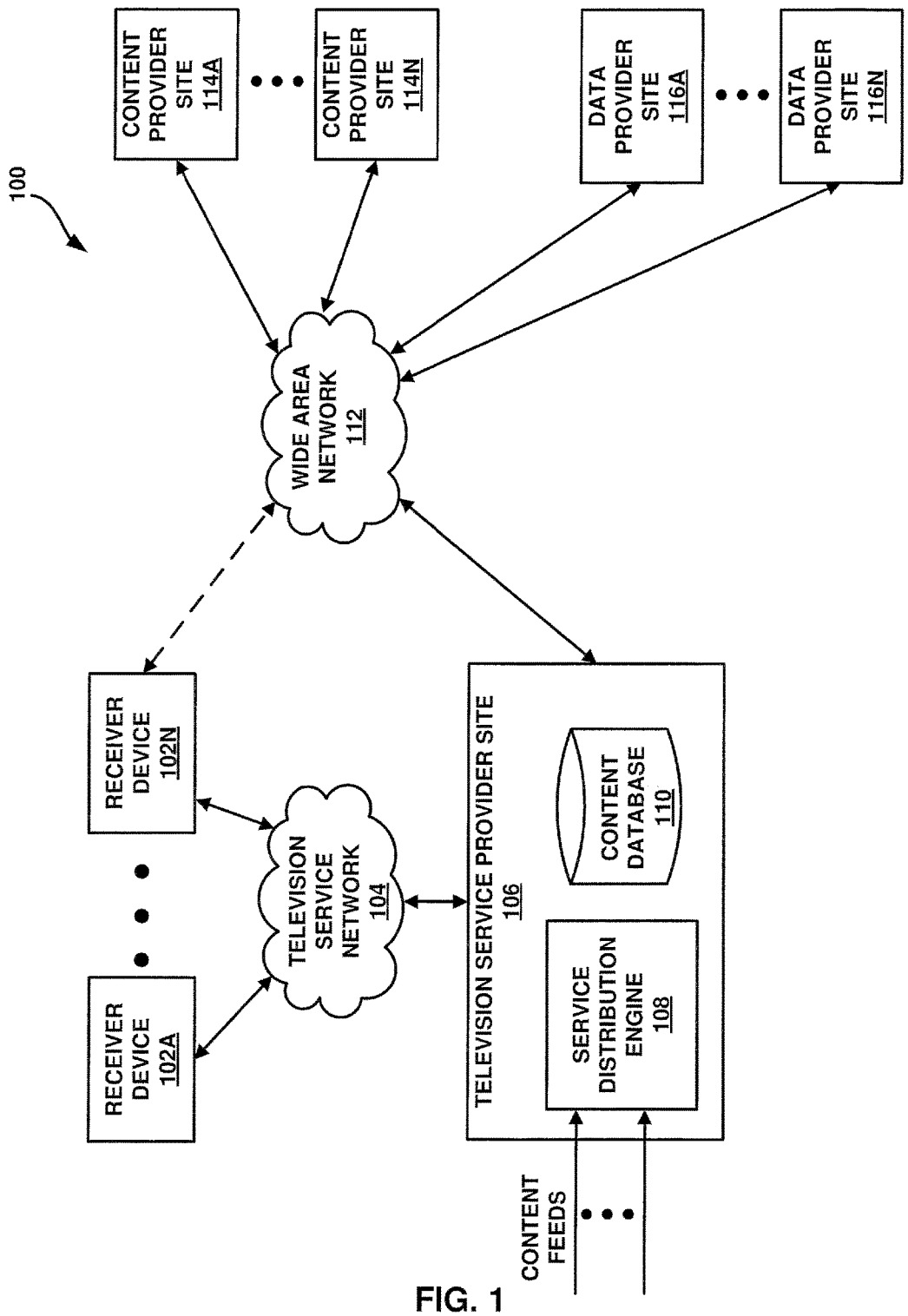
FIG. 1 is a block diagram illustrating an example of a system that may implement one or more techniques of this disclosure.

It may be useful for a receiver device to derive system time from a source and align one or more application events to a received system time. For example, an application running on a receiver device that renders a clock on a display may render the clock based on one or more system times received from a source. Current techniques for transmitting system time from a source to a receiver device may be less than ideal. It should be noted that a source and a receiver are logical roles and a single device may operate as both a source in one instance and as a receiver in another instance. For example, a set-top box may both receive data from a cable television provider and send data to the cable television provider. In order for a source device to communicate system time to a receiver device, a source device may send a representation of time to a receiver device, where the representation of time corresponds to a system time at a temporal reference point (which may be referred to as an event or a mark). In one example, the temporal reference point may correspond to a portion of a signal (e.g., a symbol).

There are multiple ways to represent system time. One way to represent system time is to provide an epoch and a time value that indicates the amount of time since the epoch. Example representations of system time include a defined epoch of 00:00:00 1/1/1970 (Midnight Jan. 1, 1970) Coordinated Universal Time (UTC), and provide a value of the amount of time since this epoch. Precision Time Protocol (PTP) provides an 80-bit (i.e., 42-bit seconds representation (secondsField) and a 32-bit nanosecond representation (nanosecondsField)) representation of the number of seconds and nanoseconds since the epoch of 00:00:00 1/1/1970 UTC. In one example, PTP may refer to a precision time protocol defined according to the IEEE 1588-2002 standard. In one example, PTP may refer to a precision time protocol defined according to the IEEE 1588-2008 standard. Each of the IEEE 1588-2002 standard and IEEE 1588-2008 standard, are incorporated by reference herein in their respective entirety. Other time protocols provide 32-bit representation of seconds since the epoch of 00:00:00 1/1/1970 UTC. It should be noted that the value of the amount of time since an epoch, may or may not account for leap seconds and the like.

Computing devices and/or transmission systems may be based on models including one or more abstraction layers, where data at each abstraction layer is represented according to particular structures, e.g., packet structures (i.e., a packet header structure and a data payload), modulation schemes, etc. An example of a model including defined abstraction layers is the so-called Open Systems Interconnection (OSI) model, which defines a 7-layer stack model, including an application layer, a presentation layer, a session layer, a transport layer, a network layer, a data link layer, and a physical layer. It should be noted that other models may include more or fewer defined abstraction layers.

A physical layer may generally refer to a layer at which electrical signals form digital data. For example, a physical layer may refer to a layer that defines how modulated radio frequency (RF) symbols form a frame of digital data. Transmission standards may define specific physical layer implementations. For example, DVB-T2, ETSI EN 302 755 V1.3.1 (2012-04), which is incorporated by reference herein in its entirety, describes an example physical layer implementation. The physical layer for the so-called ATSC 3.0 standard is currently under development. ATSC Candidate Standard: System Discovery and Signaling (Doc. A/321 Part 1), Doc. S32-231r4, 06 May 2015 (hereinafter "A/321"), which is incorporated by reference in its entirety, describes proposed aspects of the ATSC 3.0 physical layer implementation. A/321 defines a physical frame structure that includes a bootstrap, a preamble, and a data payload. The A/321 physical frame structure and variations thereof are described in detail below.

A network layer may generally refer to a layer at which logical addressing occurs. That is, a network layer may generally provide addressing information (e.g., Internet Protocol (IP) addresses) such that data packets can be delivered to a particular node (e.g., a computing device) within a network. A transport layer may generally describe how data is routed to a particular application process at a node (e.g., a media player application process running on a computing device). It should be noted that in some transmissions applications distinguishing between a network layer, a transmission layer, and/or higher layers (i.e., application layer, a presentation layer, a session layer) may be unnecessary. For example, in a broadcast application the routing of specific data to individual receiving devices may not be necessary, as during a broadcast, data may be transmitted to all receiving nodes in the network. Thus, in some examples, the term network layer may refer to a layer that includes one or more of a network layer, a transmission layer, and/or higher OSI model layers. Further, in some examples, a network layer implementation may be defined based on a set of supported defined packet structures. For example, an implemented network layer may be defined as including packets having an MPEG transport stream (MPEG-TS) packet structure or an IP version 4 (IPv4) packet structure, and optionally one or more additional similar packet structures, including, for example, a MPEG Media Transport (MMT) packet structure. In one example, an MPEG-TS may include an MPEG-2 transport stream. As used herein the term network layer may refer to a layer above a data link layer and/or a layer having data in a structure such that it may be received for data link layer processing.

As used herein, the term data link layer, which may also be referred to as a link layer, includes a layer between a physical layer and a network layer. As described in further detail below, a link layer may abstract various types of data (e.g., video data or application data) encapsulated in particular packet types (e.g., MPEG-TS packets, IPv4 packets, or link layer signaling packets, etc.) into a single generic format for processing by a physical layer. Additionally, a link layer may support segmentation of a single upper layer packet into multiple link layer packets and concatenation of multiple upper layer packets into a single link layer packet. In some cases, the term "Layer 1" or "L1" may be used to refer to the physical layer, the term "Layer 2" or "L2" may be used to refer to the link layer, and the term "Layer 3" or "L3" or "IP layer" may be used to refer to the network layer.

Network layer packets may signal time information, for example, timestamp values may be included in a network packet header (e.g., MMT packets include a timestamp value in packet headers). Time information at the network layer may be used for calculating jitter associated with a communications network, and the like, and thus can be used to manage buffers, and the like, to ensure smooth rendering of digital media content. It additional to, or as an alternative to, including time information in a network layer, in some examples, it may be useful to include time information, including for example, system time, in a lower layer, i.e., a link layer and/or a physical layer.

With respect to ATSC 3.0, it has been proposed to include the 80-bit PTP time value, described above, in the preamble of physical layer frames. It should be noted that A/321 allows physical frames to be sent at an interval of at least every 50 milliseconds (ms) and allows for physical frames to be sent at an interval up to every 5700 ms. Including an 80-bit PTP system time value in the preamble of a physical layer frame may be less than ideal. For example, assuming a physical layer frame including an 80-bit PTP time value is sent every 100 ms (i.e., sent at a frequency of 10 Hz), the data channel requirement for sending time information in this case is 800 bps (bits per second). In addition to requiring an 800 bps data channel, sending nanosecond resolution time information every 100 ms may be less than ideal as the nanosecond resolution time information may not be necessary for purposes of an application running at a receiver device. For example, an application running on a receiver device that renders a clock on a display may, at most, require receiving second resolution time information.

Further, with respect to ATSC 3.0, it has been proposed to include a compressed version of the 80-bit PTP time value, described above, in the preamble of physical layer frames. One example proposal describes a compressed time format having a 32-bit second field and a 17-bit nanosecond field. In the proposed 32-bit second field, 16 bits of value '0' are appended as most significant bits to the 32-bit value at a receiver device to generate a 48-bit value corresponding to the 80-bit PTP and 2 bits of value '0' are appended as most significant bits and 13 bits of value '0' zero are appended as least significant bits to the 17-bit nanosecond field to generate a 32-bit value corresponding the 80-bit PTP. Including this compressed 49-bit PTP system time value in the preamble of the physical layer frame may be less than ideal. For example, assuming a physical layer frame including the compressed 49-bit PTP time value is sent every 100 ms, the data channel requirement for sending time information in this case is 490 bps.

It should be noted that some receiver devices may be solely dependent on a system time received from a source (e.g., a television with no real-time clock) and other receiver devices may have access to system time from other sources (e.g., mobile devices typically have access to alternate time sources). For receiver devices solely dependent on a system time received from a source it may be desirable to quickly acquire fractional seconds of time values (e.g., milliseconds). For example, it may be desirable for television to acquire a millisecond time value from an over the air transmission within 100 ms of being powered on. Further, for receiver devices solely dependent on a system time received from a source, it may be acceptable to acquire time of day values (e.g., date, hour, minute, seconds) less quickly than fractional time values (e.g., within 10 seconds of being powered on).

For receiver devices that have access to system time from other sources (e.g., a server connected to a wide area network) it may be desirable to synchronize these time values with a time value received from an over the air television service provider. However, in some examples, there may only be a need to synchronize at higher time value resolutions (e.g., seconds, milliseconds, microseconds, or nanoseconds). In one example, a millisecond synchronization may provide a sufficiently coarse synchronization and a nanosecond synchronization may provide a sufficiently fine synchronization. The techniques described herein may enable a broadcaster to optimize the transmission of system time for a diverse set of receiver devices. That is, the techniques described herein may provide for a trade-off between fast acquisition of time (e.g., with respect to a device powering on) and channel capacity.

FIG. 1 is a block diagram illustrating an example of a system that may implement one or more techniques described in this disclosure. System 100 may be configured to communicate data in accordance with the techniques described herein. In the example illustrated in FIG. 1, system 100 includes one or more receiver devices 102A-102N, television service network 104, television service provider site 106, wide area network 112, one or more content provider sites 114A-114N, and one or more data provider sites 116A-116N. System 100 may include software modules. Software modules may be stored in a memory and executed by a processor. System 100 may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage media may include Blu-ray discs, DVDs, CD-ROMs, magnetic disks, flash memory, registers, including arrays of registers, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow digital media content, such as, for example, a movie, a live sporting event, etc., and data, and applications associated therewith, to be distributed to and accessed by a plurality of computing devices, such as receiver devices 102A-102N. In the example illustrated in FIG. 1, receiver devices 102A-102N may include any device configured to receive data from television service provider site 106. For example, receiver devices 102A-102N may be equipped for wired and/or wireless communications and may include televisions, including so-called smart televisions, set top boxes, and digital video recorders. Further, receiver devices 102A-102N may include desktop, laptop, or tablet computers, gaming consoles, mobile devices, including, for example, "smart" phones, cellular telephones, and personal gaming devices configured to receive data from television service provider site 106. It should be noted that although system 100 is illustrated as having distinct sites, such an illustration is for descriptive purposes and does not limit system 100 to a particular physical architecture. Functions of system 100 and sites included therein may be realized using any combination of hardware, firmware and/ or software implementations, and so-called cloud computation platforms.

Television service network 104 is an example of a network configured to enable digital media content, which may include television services, to be distributed. For example, television service network 104 may include public over-theair television networks, public or subscription-based satellite television service provider networks, and public or subscription-based cable television provider networks and/or over the top or Internet video service providers. It should be noted that although in some examples television service network 104 may primarily be used to enable television services to be provided, television service network 104 may also enable other types of data and services to be provided according to any combination of the telecommunication protocols described herein. Further, it should be noted that in some examples, television service network 104 may enable two-way communications between television service provider site 106 and one or more of receiver devices 102A-102N. Television service network 104 may comprise any combination of wireless and/or wired communication media. Television service network 104 may include coaxial cables, fiber optic cables, twisted pair cables, wireless transmitters and receivers, routers, switches, repeaters, base stations, or any other equipment that may be useful to facilitate communications between various devices and sites. Television service network 104 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 1, television service provider site 106 may be configured to distribute television service via television service network 104. For example, television service provider site 106 may include one or more broadcast stations, a cable television provider, or a satellite television provider, or an Internet-based television provider. In the example illustrated in FIG. 1, television service provider site 106 includes service distribution engine 108 and database 110. Service distribution engine 108 may be configured to receive data, including, for example, multimedia content, interactive applications, and messages, and distribute data to receiver devices 102A-102N through television service network 104. For example, service distribution engine 108 may be configured to transmit television services according to aspects of the one or more of the transmission standards described above (e.g., an ATSC standard). In one example, service distribution engine 108 may be configured to receive content and data through one or more sources. For example, television service provider site 106 may be configured to receive a transmission including television programming through a satellite uplink/downlink. Further, as illustrated in FIG. 1, television service provider site 106 may be in communication with wide area network 112 and may be configured to receive data from content provider sites 114A-114N and further receive data from data provider sites 116A-116N. It should be noted that in some examples, television service provider site 106 may include a television studio and content may originate therefrom.

Database 110 may include storage devices configured to store data including, for example, multimedia content and data associated therewith, including for example, descriptive data and executable interactive applications. For example, a sporting event may be associated with an interactive application that provides statistical updates. Data associated with multimedia content may be formatted according to a defined data format, such as, for example, such as, for example, Hypertext Markup Language (HTML), Dynamic HTML, Extensible Markup Language (XML), and JavaScript Object Notation (JSON), and may include Universal Resource Locators (URLs) Uniform Resource Identifier (URI) enabling receiver devices 102A-102N to access data, e.g., from one of data provider sites 116A-116N. In some examples, television service provider site 106 may be configured to provide access to stored multimedia content and distribute multimedia content to one or more of receiver devices 102A-102N through television service network 104. For example, multimedia content (e.g., music, movies, and television shows) stored in database 110 may be provided to a user via television service network 104 on a so-called on demand basis.

Wide area network 112 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, International Telecommunication Union (ITU) standards, ITU Telecommunication Standardization Sector (ITU-T) standards, and Institute of Electrical and Electronics Engineers (IEEE) standards, such as, for example, one or more of the IEEE 802 standards (e.g., Wi-Fi). Wide area network 112 may comprise any combination of wireless and/or wired communication media. Wide area network 112 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 116 may include the Internet.

Referring again to FIG. 1, content provider sites 114A-114N represent examples of sites that may provide multimedia content to television service provider site 106 and/or receiver devices 102A-102N. For example, a content provider site may include a studio having one or more studio content servers configured to provide multimedia files and/or streams to television service provider site 106. In one example, content provider sites 114A-114N may be configured to provide multimedia content using the IP suite. In one example, content provider sites 114A-114N may be configured to provide multimedia content using the IP suite. For example, a content provider site may be configured to provide multimedia content to a receiver device according to Real Time Streaming Protocol (RTSP), or Hyper-Text Transport Protocol (HTTP).

Data provider sites 116A-116N may be configured to provide data, including hypertext based content, and the like, to one or more of receiver devices 102A-102N and/or television service provider site 106 through wide area network 112. A data provider site 116A-116N may include one or more web servers. Data provided by data provider site 116A-116N may be defined according to data formats, such as, for example, HTML, Dynamic HTML, XML, and JSON. An example of a data provider site includes the United States Patent and Trademark Office website. It should be noted that in some examples, data provided by data provider sites 116A-116N may be utilized for so-called second screen applications. For example, companion device(s) in communication with a receiver device may display a website in conjunction with television programming being presented on the receiver device. It should be noted that data provided by data provider sites 116A-116N may include audio and video content.

Figure 2:
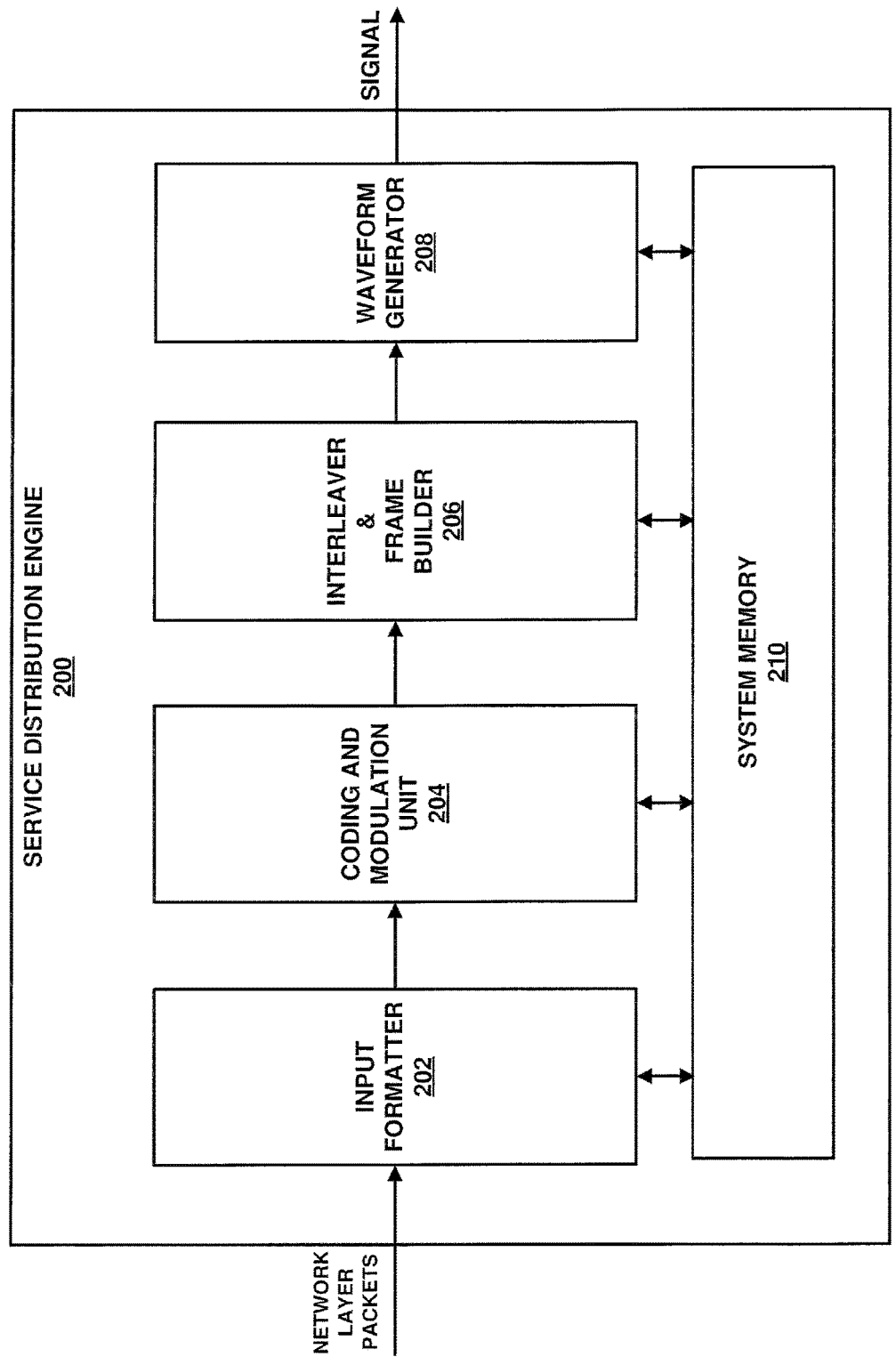
FIG. 2 is a block diagram illustrating an example of a service distribution engine that may implement one or more techniques of this disclosure.

As described above, service distribution engine 108 may be configured to receive data, including, for example, multimedia content, interactive applications, and messages, and distribute data to receiver devices 102A-102N through television service network 104. FIG. 2 is a block diagram illustrating an example of a service distribution engine that may implement one or more techniques of this disclosure. Service distribution engine 200 may be configured to receive data and output a signal representing that data for distribution over a communication network, e.g., television service network 104. For example, service distribution engine 200 may be configured to receive one or more data streams and output a signal that may be transmitted using a single RF band (e.g., a 6 MHz channel, an 8 MHz channel, etc.) or a bonded channel (e.g., two separate 6 MHz channels). A data stream may generally refer to data encapsulated in a set of one or more data packets. In the example illustrated in FIG. 2, service distribution engine 200 is illustrated as receiving data in the form of network layer packets. As described above, in one example, network layer packets may include MPEG-TS packets, IPv4 packets, and the like. It should be noted that in other examples, service distribution engine 200 may receive higher layer data (e.g., a file stored on database 110, etc.) and encapsulate data into network layer packets.

Figure 3:
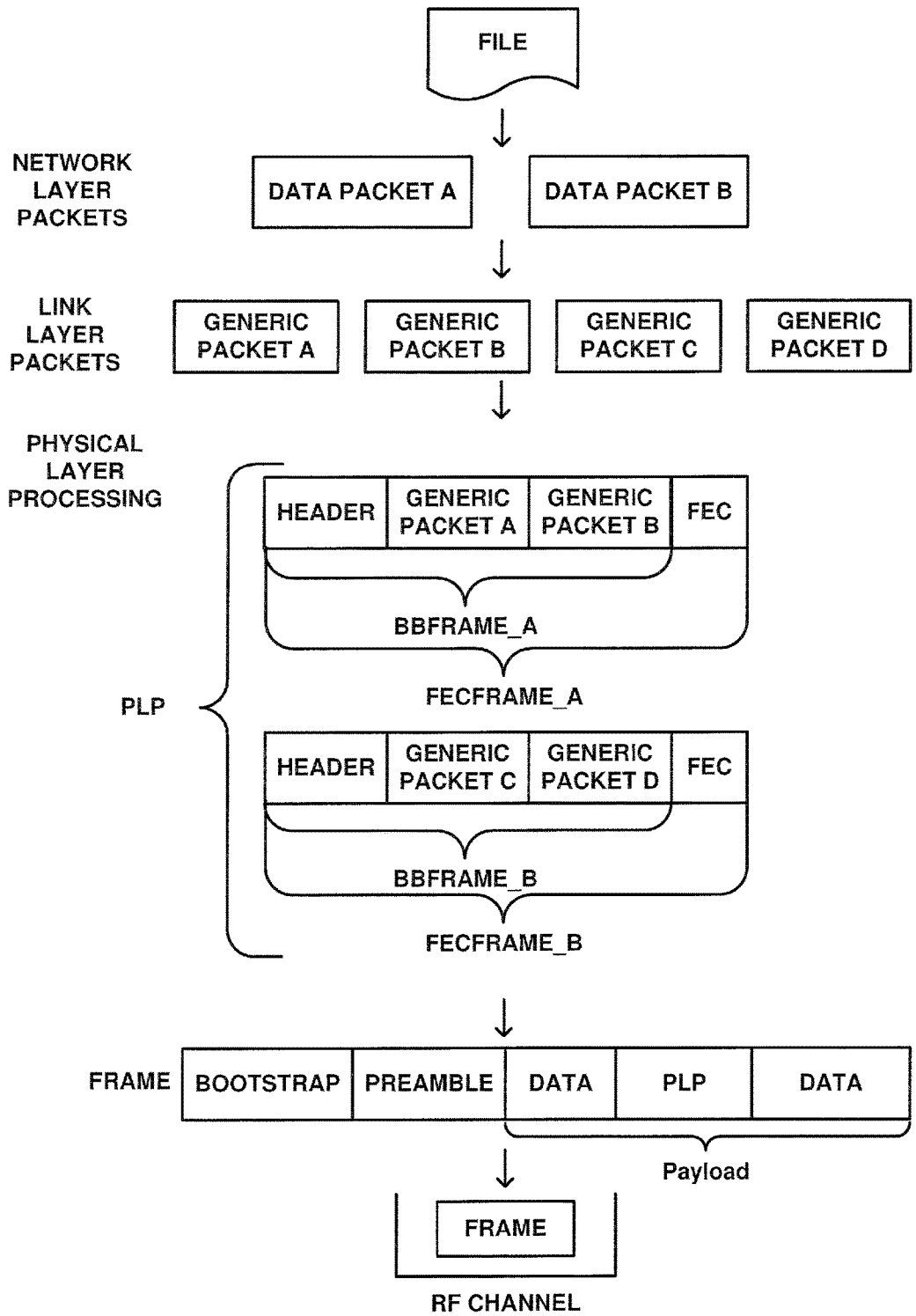
FIG. 3 is a conceptual diagram illustrating an example of generating a signal for distribution over a communication network according to one or more techniques of this disclosure.

FIG. 3 illustrates an example of how a data file (e.g., a multimedia file, an interactive application, etc.) may be transmitted as a signal within an RF channel. In the example illustrated in FIG. 3, a file is encapsulated into network layer packets, i.e., data packet A and data packet B. In the example illustrated in FIG. 3, data packet A and data packet B are encapsulated into link layer packets, i.e., generic packet A, generic packet B, generic packet C, and generic packet D. It should be noted that although, in the example illustrated in FIG. 3, two network layer packets are illustrated as being encapsulated within four link layer packets (i.e., segmentation), in other examples, a number of network layer packets may be encapsulated into a smaller number of link layer packets (i.e., concatenation). For example, multiple network layer packet may be encapsulated into a single link layer packet. Aspects of a link layer packet structure may be defined according to a communications standard. For example, a link layer packet may have a header format and minimum and maximum lengths defined according to a communications standard.

In the example illustrated in FIG. 3, generic packets are received for physical layer processing. In the example illustrated in FIG. 3, physical layer processing includes encapsulating generic packet A, generic packet B, generic packet C, and generic packet D in respective baseband frames, i.e., BBFrame_A and BBFrame_B. Baseband frames may form a physical layer pipe (PLP). In one example, a PLP may generally refer to a logical structure including all or portions of a data stream. In some examples, a PLP may be described as a logical channel carried within one or multiple data slices. In the example illustrated in FIG. 3, the PLP is included within the payload of a physical layer frame. As described above, and in further detail below, a physical frame may include a bootstrap, a preamble, and a data payload.

Referring again to FIG. 2, as illustrated in FIG. 2, service distribution engine 200 includes input formatter 202, coding and modulation unit 204, interleaver and frame builder 206, waveform generator 208, and system memory 210. Each of input formatter 202, coding and modulation unit 204, interleaver and frame builder 206, waveform generator 208, and system memory 210 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although service distribution engine 200 is illustrated as having distinct functional blocks, such an illustration is for descriptive purposes and does not limit service distribution engine 200 to a particular hardware architecture. Functions of service distribution engine 200 may be realized using any combination of hardware, firmware and/or software implementations, including so-called cloud computing architectures.

System memory 210 may be described as a non-transitory or tangible computer-readable storage medium. In some examples, system memory 210 may provide temporary and/or long-term storage. In some examples, system memory 210 or portions thereof may be described as non-volatile memory and in other examples portions of system memory 210 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. System memory 210 may be configured to store information that may be used by service distribution engine 200 during operation. It should be noted that system memory 210 may include individual memory elements included within each of input formatter 202, coding and modulation unit 204, interleaver and frame builder 206, and/or waveform generator 208. For example, system memory 210 may include one or more buffers (e.g., First-in First-out (FIFO) buffers) configured to store data for processing by a component of service distribution engine 200. Further, system memory 210 may include one or more registers, which may be used in chip-to-chip data transfer and communication. In one example, an 80-bit PTP value may be stored as an internal array of registers. For example, at a receiver device, and as different partial time values arrive, they may be loaded into different parts of an 80-bit array of registers. In this example, components of the receiver device could read off the entire (or part thereof) 80-bit PTP as the system clock.

Referring again to FIG. 2, input formatter 202 may be configured to receive data, including data corresponding to multimedia content and define a PLP. Input formatter 202 may be configured to receive network packets and generate packets according to a link layer ("generic") packet structure. Input formatter 202 may be configured to define a PLP structure for a set of link layer packets. In one example, input formatter 202 may be configured to determine how a set of link layer packets corresponding to a data stream will be encapsulated in one or more baseband frames. In some examples, a baseband frame may be a fixed length (e.g., defined according to a communications standard) and may include a header and a payload including generic packets.

Coding and modulation unit 204 may be configured to receive baseband frames associated with a PLP and transform the data included in the baseband frames into cells. A cell may include constellation points associated with a modulation scheme. In one example, a constellation may be defined as a set of encoded (in-phase(I)/quadrature(Q) component) points in an I/Q plane. In one example, a cell may include a modulation value for one orthogonal frequency-division multiplexing (OFDM) carrier during one OFDM symbol. That is, coding and modulation unit 204 may be configured to map bits to constellations defined according to a modulation scheme, including, for example, Quadrature Phase Shift Keying (QPSK) and Quadrature Amplitude Modulation (QAM) schemes (e.g., 16QAM, 64QAM, 256-QAM, 1024QAM, and 4096QAM). It should be noted that in some examples, coding and modulation unit 204 may be configured to support layer division multiplexing. Layer division multiplexing may refer to super-imposing multiple layers of data on the same RF channel (e.g., a 6 MHz channel). Typically, an upper layer refers to a core (e.g., more robust) layer supporting a primary service and a lower layer refers to a high data rate layer supporting enhanced services. For example, an upper layer could support basic High Definition video content and a lower layer could support enhanced Ultra-High Definition video content.

In one example, coding and modulation unit 204 may receive baseband frames and append baseband frames with forward error correction (FEC) information. In one example, FEC information may include an inner code and an outer code. It should be noted that in some examples, a baseband frame including FEC information may be referred to as an FEC frame. In one example, coding and modulation unit 204 may interleave bits included in baseband frame. That is, coding and modulation unit 204 may perform bit interleaving schemes, including, for example, parity interleaving, column twist interleaving, group-wise interleaving, and/or block interleaving. Bit-interleaving may increase the robustness of data transmission. Coding and modulation unit 204 may map interleaved bits to constellations, thereby forming cells.

Referring again to FIG. 2, interleaver and frame builder 206 may be configured to receive data cells associated with one or more PLPs and output symbols (e.g., OFDM symbols) arranged in a frame structure. A frame including one or more PLPs may be referred to as a physical layer frame (PHY-Layer frame). In one example, a frame structure may include a bootstrap, a preamble, and a data payload including one or more PLPs. A bootstrap may act as a universal entry point for a waveform. As described above, in some cases, the term "Layer 1" or "L1" may be used to refer to the physical layer. In this case, L1-signaling may refer to signaling that provides necessary information to configure physical layer parameters. In one example, L1-signaling may be defined as including three parts: constraints on a bootstrap, L1-Basic signaling, and L1-Detail signaling. Both L1-Basic signaling and L1-Detail signaling may be carried in preamble symbols. In one example, L1-Basic signaling conveys the most fundamental signaling information of a system which is static over the complete frame and also defines the parameters needed to parse L1-Detail signaling. In some examples, the length of L1-Basic signaling may be fixed at 200 bits. In one example, L1-Detail signaling details the data context and the required information to parse it. In one example, the length of L1-Detail signaling may be variable.

Figure 4:
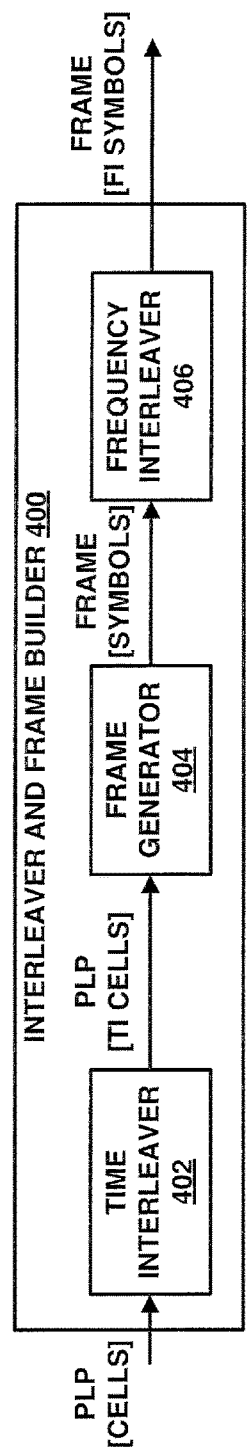
FIG. 4 is a block diagram illustrating an example of an interleaver and frame builder that may implement one or more techniques of this disclosure.

FIG. 4 is a block diagram illustrating an example of an interleaver and frame builder that may implement one or more techniques of this disclosure. As illustrated in FIG. 4, interleaver and frame builder 400 includes time interleaver 402, frame generator 404, and frequency interleaver 406. Time interleaver 402 may be configured to perform one or more time interleaving schemes to separate burst errors in the time domain. Examples of time interleaving schemes include cell interleaving, twisted block interleaving, and convolution interleaving. Frequency interleaver 406 may be configured to perform one or more frequency interleaving schemes to separate burst errors in the frequency domain. In one example, frequency interleaver 406 may be configured to map data cells of one symbol to available data carriers. Frame generator 404 may be configured to map one or more PLPs to a frame. Frame generator 404 may be configured to receive data cells associated with one or more PLPs and output symbols (e.g., OFDM symbols) arranged in a frame structure. Further, frame generator 404 may be configured to generate a preamble according to one or more of the techniques described herein. Example preamble structures are described in detail below.

Figure 5:
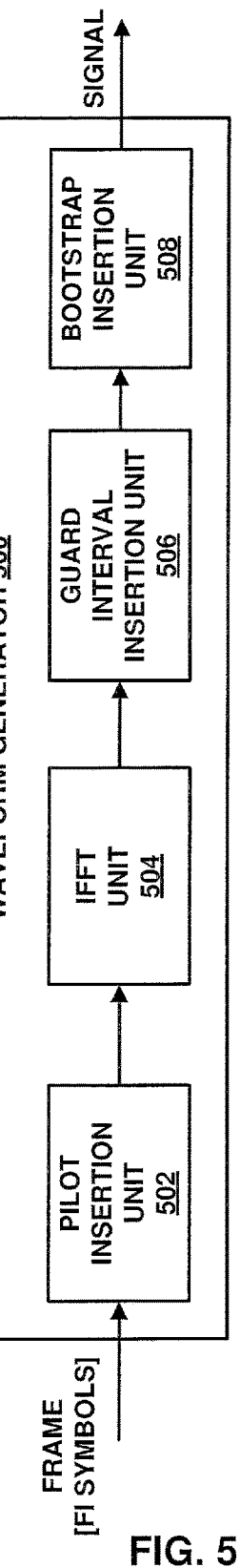
FIG. 5 is a block diagram illustrating an example of a waveform generator that may implement one or more techniques of this disclosure.

Referring again to FIG. 2, waveform generator 208 may be configured to receive symbols arranged in frames and produce a signal for transmission. FIG. 5 is a block diagram illustrating an example of a waveform generator that may implement one or more techniques of this disclosure. As illustrated in FIG. 5, waveform generator 500 includes pilot insertion unit 502, inverse fast Fourier transform (IFFT) unit 504, guard interval insertion unit 506, and bootstrap insertion unit 508. In the example illustrated in FIG. 5, waveform generator 500 may be configured to receive OFDM symbols and produce a signal for transmission within one or more of types of RF channels: a single 6 MHz channel, a single 7 MHz channel, single 8 MHz channel, a single 11 MHz channel, and bonded channels including any two or more separate single channels (e.g., a 14 MHz channel including a 6 MHz channel and a 8 MHz channel).

Pilot insertion unit 502 may be configured to insert pilots and reserved tones for channel estimation and/or synchronization. In one example, pilots and reserved tones may be defined according to an OFDM symbol and sub-carrier frequency map. IFFT unit 504 may be configured to generate a waveform. That is, in one example, IFFT unit 504 may be configured to generate an OFDM waveform by mapping OFDM symbols to sub-carriers. Guard interval insertion unit 506 may be configured to insert guard intervals to mitigate potential multipath effects. In one example, guard intervals may be specified according to a communications standard.

As described above, a frame structure may include a bootstrap, a preamble, and a data payload including one or more PLPs. Bootstrap insertion unit 508 may be configured to insert a bootstrap. A bootstrap may consist of a number of symbols including a synchronization symbol to enable discovery, synchronization, frequency offset estimation, and initial channel estimation. Further, a bootstrap may include sufficient control signaling to permit the reception and decoding of a frame. As described above, A/321 provides an example structure of a bootstrap. The example bootstrap described in A/321 includes a fixed sampling rate and a fixed bandwidth (i.e., 4.5 MHz regardless of channel size) and includes three symbols. The syntax of the first symbol of the bootstrap described in A/321 is illustrated in Table 1 below.

TABLE 1

| Syntax | Number of Bits | Format |
| --- | --- | --- |
| bootstrap_symbol_1( ){ | | |
| eas_wake_up | 1 | uimsbf |
| system_bandwidth | 2 | uimsbf |
| min_time_to_next | 5 | uimsbf |
| } | | |

In Table 1 (and in tables below), uimsbf indicates a data format of unsigned integer with the most significant bit occurring first. A/321 provides the following definitions with respect to elements eas_wake_up, system_bandwidth, and min_time_to_next.

eas_wake_up—Indicates whether or not there is an emergency. Value: 0=Off (No emergency), 1=On (Emergency). The case of eas_wake_up=1 indicates that Emergency Alert System (EAS) information is present in at least some frames.

system_bandwidth—Signals the system bandwidth used for the post-bootstrap portion of the current PHY-layer frame. Values: 00=6 MHz, 01=7 MHz, 10=8 MHz, 11=Greater than 8 MHz. The "Greater than 8 MHz" option facilitates future operation using a system bandwidth greater than 8 MHz, but is not intended to be used by the version described by the present signaling set. Receivers that are not provisioned to handle a system bandwidth greater than 8 MHz would not be expected to receive any frames where system_bandwidth=11.

min_time_to_next—The minimum time interval to the next frame (B) that matches the same major and minor version number of the current frame (A), defined as the time period measured from the start of the bootstrap for frame A (referred to as bootstrap A) to the earliest possible occurrence of the start of the bootstrap for frame B (referred to as bootstrap B). Bootstrap B is guaranteed to lie within the time window beginning at the signaled minimum time interval value and ending at the next-higher minimum time interval value that could have been signaled. If the highest-possible minimum time interval value is signaled, then this time window is unterminated. In the signal mapping formulas shown below, an example signaled value of X=10 would indicate that bootstrap B lies somewhere in a time window that begins 700 ms from the start of bootstrap A and ends 800 ms from the start of bootstrap A. The quantity is signaled via a sliding scale with increasing granularities as the signaled minimum time interval value increases. Let X represent the 5-bit value that is signaled, and let T represent the minimum time interval in milliseconds to the next frame that matches the same version number as the current frame.

$$T = \begin{cases} T = 50 \times X + 50; & 0 \le X < 8 \\ T = 100 \times (X - 8) + 500; & 8 \le X < 16 \\ T = 200 \times (X - 16) + 1300; & 16 \le X < 24 \\ T = 400 \times (X - 24) + 2900; & 24 \le X < 32 \end{cases}$$

The syntax of the second symbol of the bootstrap described in A/321 is illustrated in Table 2 below.

TABLE 2

| Syntax | Number of Bits | Format |
| --- | --- | --- |
| bootstrap_symbol_2( ){ | | |
|   bsr_coefficient | 7 | uimsbf |
| } | | |

A321 provides the following definitions with respect to element bsr_coefficient: bsr_coefficient—Sample Rate Post-Bootstrap (of the current PHY-Layer frame)=(N+16)×0.384 MHz. N is the signaled value and shall be in the range from 0 to 80, inclusive. Values of 81 to 127 are reserved.

The syntax of the third symbol of the bootstrap described in A/321 is illustrated in Table 3 below.

TABLE 3

| Syntax | Number of Bits | Format |
| --- | --- | --- |
| bootstrap_symbol_3( ){ | | |
|   preamble_structure | 7 | uimsbf |
| } | | |

A/321 provides the following definitions with respect to element preamble_structure: preamble_structure—This field establishes the capability to signal the structure of one or more RF symbols following the last bootstrap symbol. It is provided to enable such signaling by use of values defined by another Standard. Note: This standard places no constraint on the contents of this field.

Figure 6:
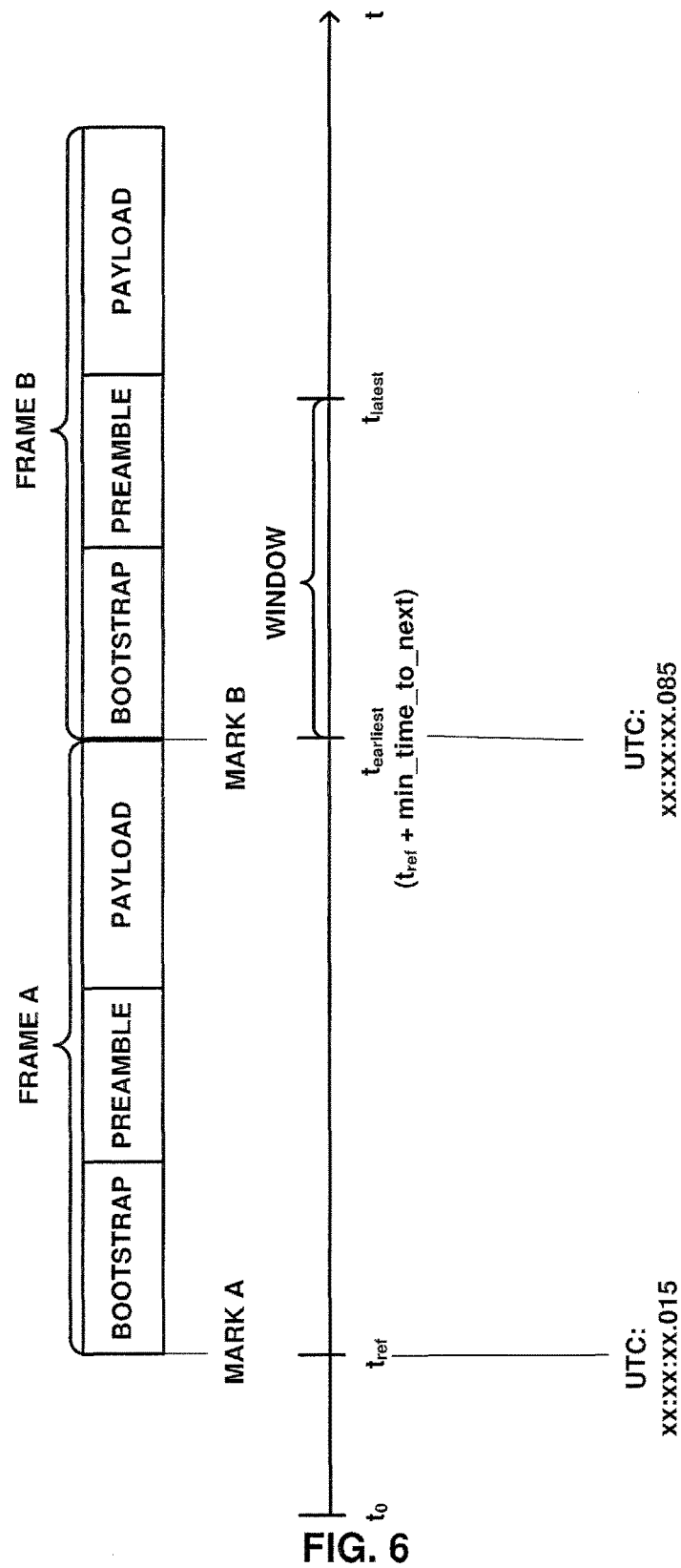
FIG. 6 is a conceptual diagram illustrating an example of data communication according to one or more techniques of this disclosure.

The time at which the first OFDM symbol of a bootstrap is emitted from a source may be referred to as the start time of a bootstrap. It should be noted that A/321 assumes that a bootstrap will arrive at a receiver device within 1 ms of an emission time from a source device. That is, assuming a receiver device is within a 20 mile radius of a source, an emission traveling at the speed of light will reach all receiving devices within a 20 mile radius within 1 ms of the emission time. In this manner, start times may be measured at receiving devices with 1 ms granularity. The start time of a bootstrap may be used as a reference point in time (i.e., a mark). FIG. 6 is a conceptual diagram illustrating the emission and/or arrival timing of physical layer frame A and physical layer frame B. In the example illustrated in FIG. 6, the start time of physical layer frame A is at a 15 ms UTC boundary. As illustrated in FIG. 6, the 15 ms UTC boundary may be used as a mark for frame A. As described above, a bootstrap may include a min_time_to_next value which may define a window ($t_{earliest}$ to $t_{latest}$ in FIG. 6) including the earliest occurrence of the start of the bootstrap for frame B. As illustrated in FIG. 6, frame B arrives at an 85 ms UTC boundary and the start of frame B is within the window signaled in frame A.

As described above, in order for a source device to communicate system time to a receiver device, a source device may send a representation of time to a receiver device, where the representation of time corresponds to a system time at a mark. In one example, as described in detail below, a representation of time may be signaled in a preamble of a frame and may indicate the time at the start of the bootstrap. That is, referring to the example illustrated in FIG. 6, a time signaled in the preamble of frame A may provide the time at mark A.

In one example, the representation of time may include a partial time value. A partial time value may refer to a time value that provides information with respect to a portion of a system time value. For example, one partial time value may provide a seconds time value (e.g., 10.XXX seconds) and another partial time value may provide a milliseconds (e.g., XX.123 seconds) time value. Each partial time value may be signaled at different points in a physical frame (e.g., at different layers) and/or in different frames. A plurality of different partial time values may be used to reconstruct system time to a desired precision (e.g., a 10.XXX seconds and XX.123 seconds may be used to construct a system time value of 10.123 seconds). It should be noted that different partial time values naturally have different rates of change. Examples of partial time values include a seconds (Hz) partial time value, a millisecond partial time value (kHz), a microsecond partial time value (MHz), and a nanosecond (GHz) partial time value.

Figure 7:
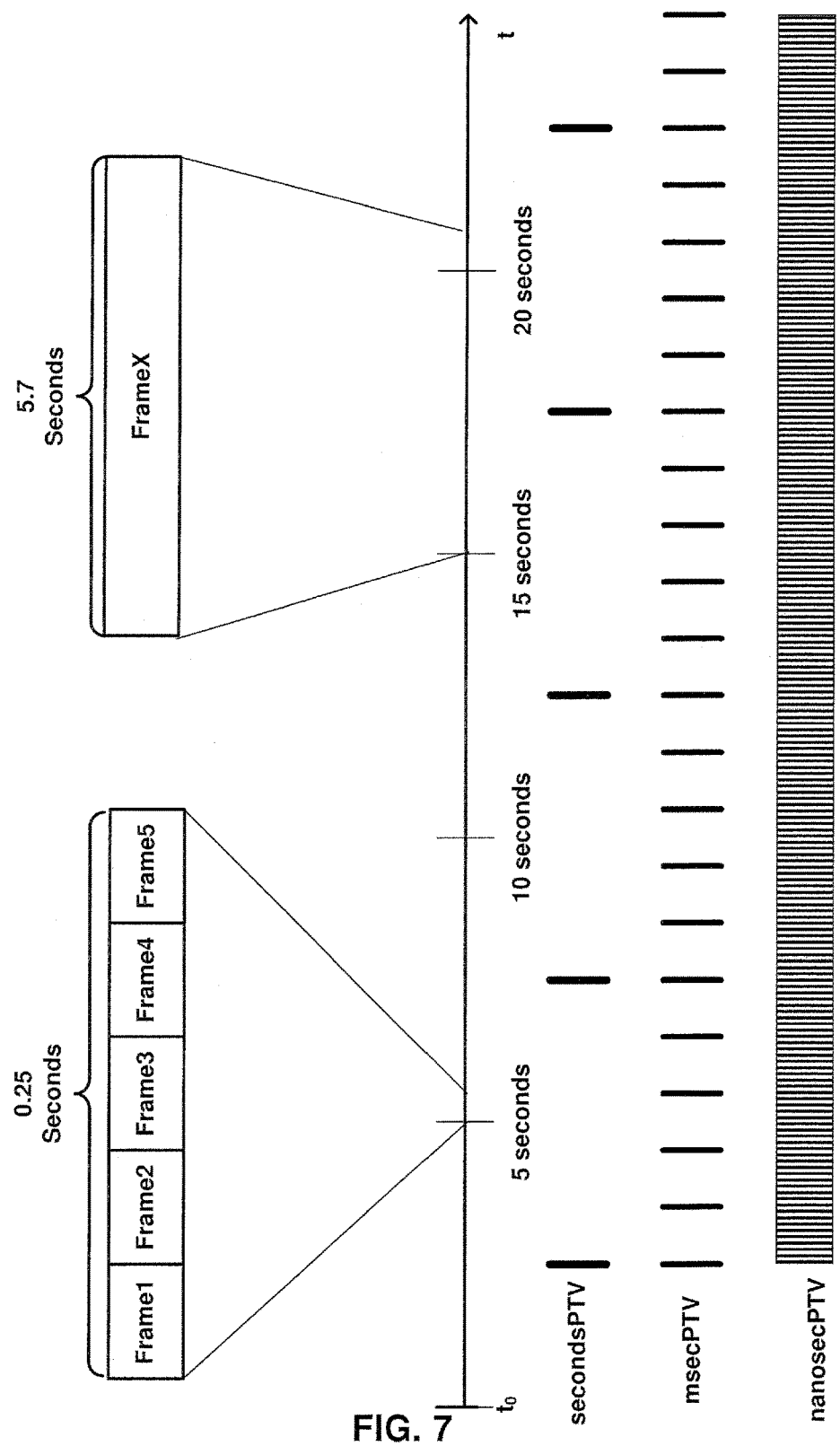
FIG. 7 is a conceptual diagram illustrating an example of data communication according to one or more techniques of this disclosure.

FIG. 7 illustrates an example where partial time values are transmitted at different intervals (i.e., frequencies) based on respective rates of change. In the example illustrated in FIG. 7, secondsPTV, corresponds to a seconds time value and is transmitted at least every 5 seconds (i.e., at a frequency≥0.2 Hz), msecPTV corresponds to a milliseconds time value and is transmitted at least once every 1 second (i.e., at a frequency≥1 Hz), and nanosecPTV corresponds to a nanoseconds time value and is transmitted at least once in every 50 milliseconds (i.e., at a frequency≥20 Hz).

As illustrated in FIG. 7 and described in A/321 different time intervals may correspond to a different number of transmitted frames. In the example illustrated in FIG. 7, a 0.25 second interval includes 5 frames in one instance. This may correspond to the case in A/321 where physical layer frames are transmitted every 50 ms. Further, in the example illustrated in FIG. 7, a 5.7 second interval includes 1 frame in another instance. This may correspond to the maximum frame size provided in A/321. Thus, in some cases, the frequency at which partial time values are transmitted may be subject to whether a subsequent physical frame will be transmitted within the interval. Thus, in one example, a partial time value transmission interval may be defined as the next physical frame after a specified time value (e.g., the next physical frame after 1 second, etc.). As described in further detail below, in some examples, partial time value transmission intervals may be based on a number of frames (e.g., transmit a partial time value every X frames).

As described above, in some examples, partial time values may be signaled at different layers. Table 4 provide an example of packet types for link layer packets. In one example, partial time values may be included in a link layer signaling packet, or as part of reserved packet types.

TABLE 4

| Packet_Type Value | Meaning |
| --- | --- |
| 000 | Ipv4 packet |
| 001 | Compressed IP packet |
| 010 | MPEG-2 Transport Stream |
| 011 | Reserved |
| 100 | Link layer signaling packet |
| 101 | Reserved |
| 110 | Reserved |
| 111 | Packet Type Extension |

As described above, in order for a source device to communicate system time to a receiver device, a source device may send a representation of time to a receiver device, where the representation of time corresponds to a system time at a mark. Various levels of precision may be used for a representation of time (e.g., 80-bit nanosecond precision or 32-bit second precision). It should be noted that because there are a billion nanoseconds in a second, 30-bits may be used to span fractional time with nanosecond resolution (i.e., $2^{30}=1,073,741,824$).

In one example, possible nanosecond values (i.e., the one billion possible nanosecond values) may be constrained to a smaller set and this smaller set may be represented by fewer than 30 bits. In one example, a smaller set may correspond to particular nanosecond values. For example, a 2-bit code may specify four respective nanosecond values. Table 5 provides an example of a 2-bit code and corresponding nanosecond values. As illustrated in Table 5, the code values do not necessarily need to be equally spaced within a range.

TABLE 5

| Code | Value |
| --- | --- |
| 00 | xx:xx:xx.000 000 000 |
| 01 | xx:xx:xx.000 100 000 |
| 10 | xx:xx:xx.000 500 030 |
| 11 | xx:xx:xx.123 456 789 |

In one example, a smaller set of nanosecond values may include the 1000 millisecond boundary values. In this case, a 10-bit may specify each of the 1000 values. It should be noted that in this case, 24 reserve values would be available (i.e., $2^{10}=1024$). Table 6 provides an example of a 10-bit code representing 1000 nanosecond values at millisecond boundaries.

TABLE 6

| Code | Value |
| --- | --- |
| 0000000000 | xx:xx:xx.000 000 000 |
| ... | ... |
| 1111100111 | xx:xx:xx.999 000 000 |
| 1111101000 to 1111111111 | Reserved |

In a similar manner, in one example, a smaller set of nanosecond values may include the 60 second boundaries values. In this example, a 6-bit code may specify each of the 60 values. It should be noted that in this case, 4 reserve values would be available (i.e., $2^6=64$). Table 7 provides an example of a 6-bit code representing 60 nanosecond values at second boundaries.

TABLE 7

| Code | Value |
| --- | --- |
| 000000 | xx:xx:00.000 000 000 |
| ... | ... |
| 111011 | xx:xx:59.000 000 000 |
| 111100 to 111111 | Reserved |

It should be noted that in A/321 because a bootstrap is aligned to a millisecond value, as described above, a 6-bit code representing 60 nanosecond values at second boundaries may be inadequate. That is, only bootstraps aligned at second boundaries would accurately be signaled at the nanosecond precision.

As described above, a plurality of different partial time values may be used to reconstruct system time to a desired precision. Example syntax for a plurality of different partial time values that may be used to reconstruct system time are illustrated in Table 8A to Table 10 below. In each of Table 8A to Table 10 the field "Other_preamble_stuff( ) AND/OR Other_link_layer_stuff( )" indicates that the all or a portion of the example semantics may be included as part of any of a physical layer preamble (e.g., L1-Basic or and L1-Detail) or a link layer. The example semantics in Table 8A to Table 11 may provide a better trade-off between fast acquisition and channel capacity than conventional techniques for transmitting system time. Further, the example syntax illustrated in Table 8A to Table 10 may provide broadcasters with independent control and choice over the frequency of transmitting full_secondsPTV, fast_secondsPTV, and millisecondsPTV elements. For example, under some circumstances (e.g., an Emergency Alert) a broadcaster may choose to increase the transmission rate of full_secondsPTV, to potentially line up with the rate of transmission for fast_secondsPTV. For example, a broadcaster may choose to transmit a value for each of full_secondsPTV, fast_secondsPTV, and millisecondsPTV every two physical frames.

TABLE 8A

| Syntax | Bit field | Type |
|---|---|---|
| Other_preamble_stuff( ) | | |
| AND/OR | | |
| Other_link_layer_stuff( ) | | |
| { | | |
| slowPTV_present | 1 | uimsbf |
| fastPTV_present | 1 | uimsbf |
| If (slowPTV_present) | | |
| full_secondsPTV | 32 | uimsbf |
| millisecondsPTV | 11 | uimsbf |
| If (fastPTV_present) | | |
| fast_secondsPTV | 6 | uimsbf |
| millisecondsPTV | 11 | uimsbf |
| ... | | |
| } | | |

TABLE 8B

| Syntax | Bit field | Type |
|---|---|---|
| Other _preamble_stuff( ) | | |
| AND/OR | | |
| Other_link_layer_stuff( ) | | |
| { | | |
| slowPTV_present | 1 | uimsbf |
| fastPTV_present | 1 | uimsbf |
| If (slowPTV_present) | | |
| full_secondsPTV | 32 | uimsbf |
| If(fastPTV_present) | | |
| fast_secondsPTV | 6 | uimsbf |
| If (slowPTV_present OR fastPTV_present) | | |
| millisecondsPTV | 11 | uimsbf |
| ... | | |
| } | | |

In the examples illustrated in Table 8A and Table 8B, slowPTV_present and fastPTV_present may respectively indicate whether full_secondsPTV and fast_secondsPTV are present. Further, either of slowPTV_present or fastPTV_present may indicate that millisecondsPTV is present. The following example definitions may be used for example syntax elements, full_secondsPTV, fast_secondsPTV, and millisecondsPTV.

full_secondsPTV—A 32-bit value representing a PTP epoch seconds field at the Mark. In one example, the Mark is defined as the start of the previous bootstrap. This is the lower (LSB-wise (least significant bit-wise)) 32 bits of the 48-bit PTP secondsField.

fast_secondsPTV—A 6-bit value representing a partial seconds field, with up to nanosecond precision, at the Mark. In one example, the Mark is defined as the start of the previous bootstrap. At the Mark, receivers shall load the 6 LSBs into its 48-bit PTP secondsField. The 42 MSBs in the receiver's 48-bit PTP secondsField shall not be affected.

millisecondsPTV—An 11-bit value representing a millisecond field, with half-millisecond precision, at the Mark. In one example, the Mark is defined as the start of the previous bootstrap. In one example, at the Mark, receivers shall round down the 11-bit value to a 10-bit value, load the 10 bits into its 32-bit PTP nanosecondsField. The 2 MSBs and the 20 LSBs in the receiver's 32-bit PTP nanosecondsField shall be set to the value of 0.

It should be noted that for millisecondsPTV, nanosecond precision is provided. If a precision of approximately 2 ms is required, the 20 LSBs should be untouched.

Figure 8:
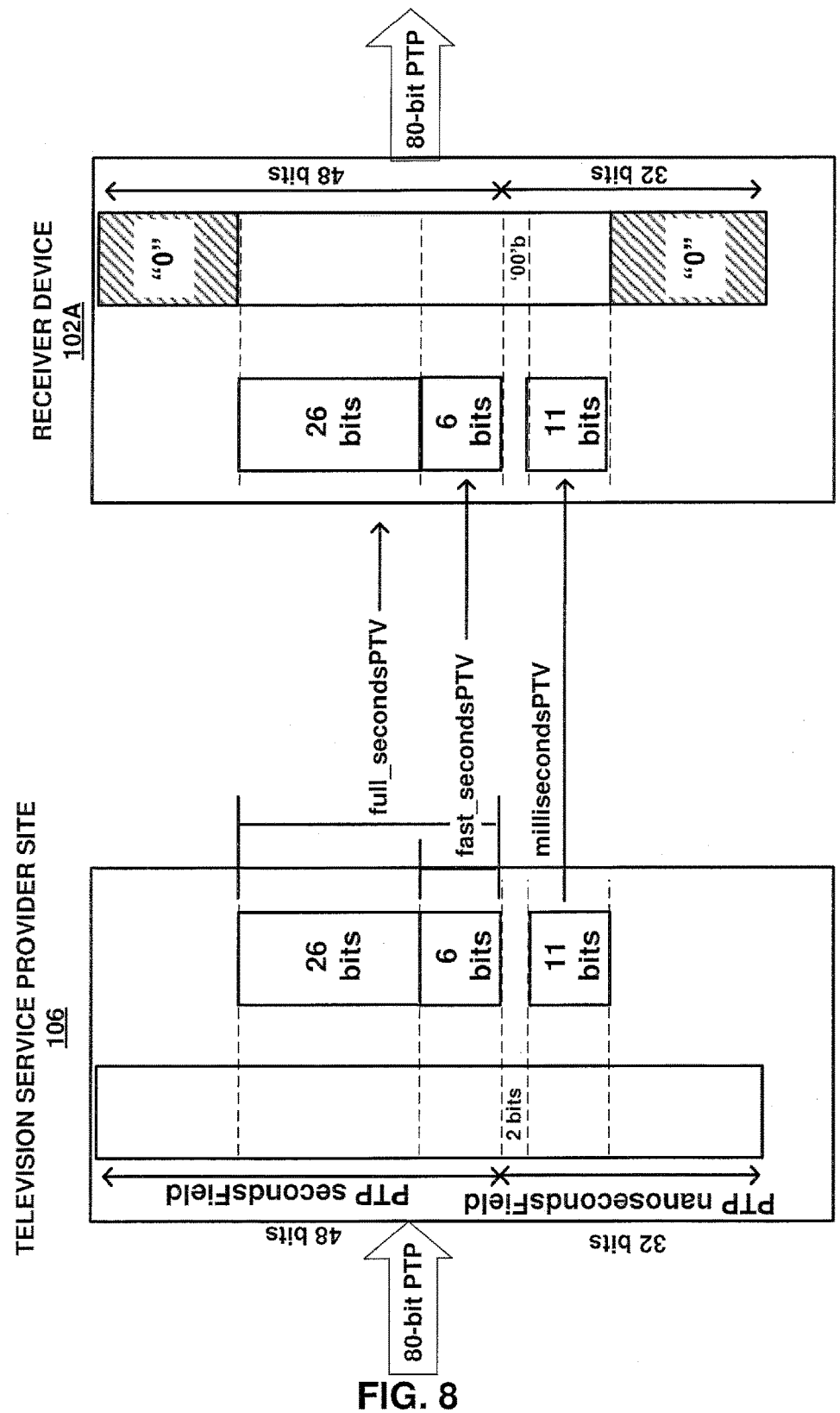
FIG. 8 is a conceptual diagram illustrating an example of data communication according to one or more techniques of this disclosure.
Figure 9:
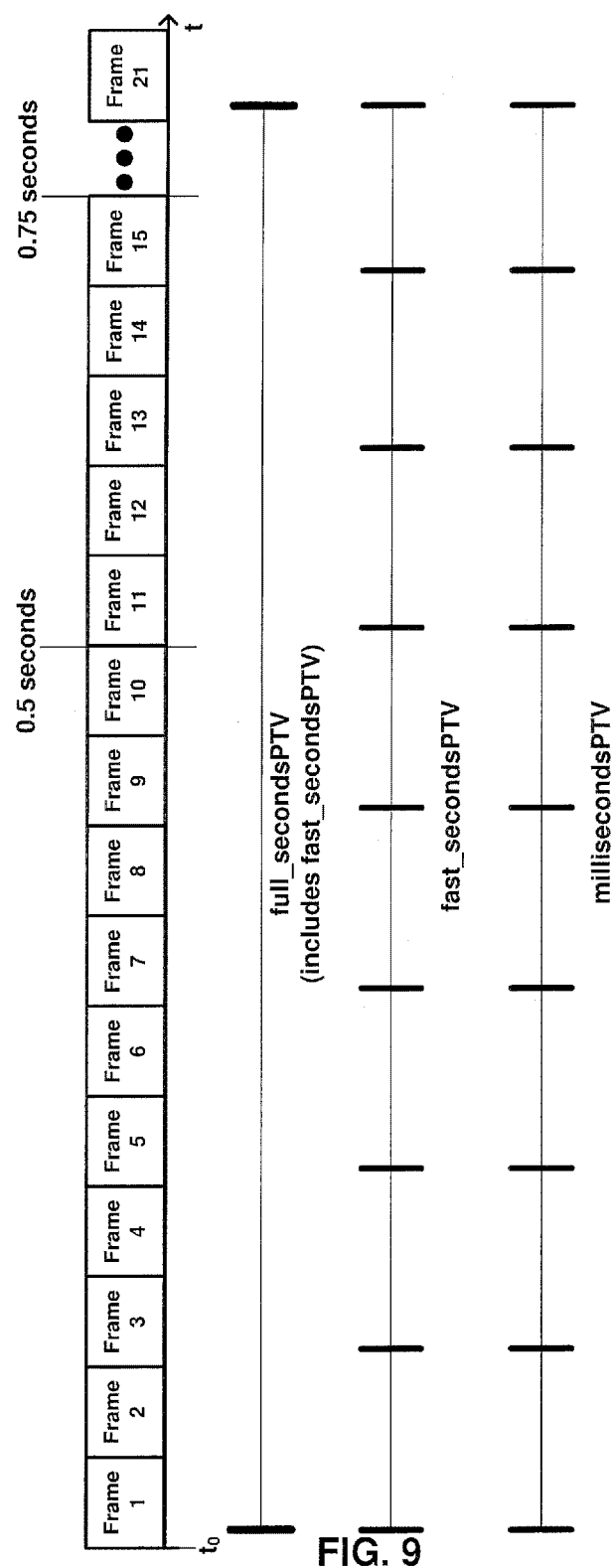
FIG. 9 is a conceptual diagram illustrating an example of data communication according to one or more techniques of this disclosure.

FIG. 8 is a conceptual diagram illustrating how an 80-bit PTP time value may be compressed at television service provider site 106 and decompressed at a receiver device 102A based on example syntax elements, full_secondsPTV, fast_secondsPTV, and millisecondsPTV. As described above, with respect to FIG. 7, different partial time values may be transmitted at different intervals. In one example, full_secondsPTV may be transmitted once per 20 frames, fast_secondsPTV may be transmitted once per 2 frames, and/or millisecondsPTV may be transmitted once per 2 frames. In the case where physical frames are transmitted every 50 ms, this example provides the following transmission frequencies, full_secondsPTV: 1 Hz; fast_secondsPTV: 10 Hz; and millisecondsPTV: 10 Hz. FIG. 9 is a conceptual diagram illustrating an example of slow_secondsPTV, fast_secondsPTV, and fast_msecondsPTV being transmitted at these frequencies.

As described above, the data channel requirement for sending an 80-bit PTP time value every 100 ms is 800 bps and the data channel requirement for sending a 49-bit compressed PTP time value every 100 ms is 490 bps. Based on the example illustrated in FIG. 9 and the example syntax provided in Table 8A, transmitting full_secondsPTV at 1 Hz, fast_secondsPTV at 10 Hz and millisecondsPTV at 10 Hz provides a time value every 100 ms and has a data channel requirement of 233 bps. That is, 32-bps for full_secondsPTV at 1 Hz, 11 bps millisecondsPTV at 1 Hz, 60 bps for fast_secondsPTV at 10 Hz, 110 bps millisecondsPTV at 10 Hz, and 20 bps for signaling elements slowPTV_present and fastPTV_present. Further, based on the example illustrated in FIG. 9 and the example syntax provided in Table 8B, transmitting full_secondsPTV at 1 Hz, fast_secondsPTV at 10 Hz and millisecondsPTV at 10 Hz provides a time value every 100 ms and has a data channel requirement of 222 bps. That is, 32-bps for full_secondsPTV at 1 Hz, 60 bps for fast_secondsPTV at 10 Hz, 110 bps millisecondsPTV at 10 Hz, and 20 bps for signaling elements slowPTV_present and fastPTV_present. Thus, the examples partial time value syntax elements full_secondsPTV, fast_secondsPTV, and millisecondsPTV may provide a better trade-off between fast acquisition and channel capacity than conventional techniques for transmitting system time.

In one example, syntax elements other than slowPTV_present and fastPTV_present may be used to indicate whether one or more of full_secondsPTV, fast_secondsPTV, and millisecondsPTV are present. Each of Table 9 to Table 11 provides an example syntax where syntax elements other than slowPTV_present and fastPTV_present are used to indicated whether one or more of full_secondsPTV, fast_secondsPTV, and millisecondsPTV are present.

TABLE 9

| Syntax | Bit field | Type |
|---|---|---|
| Other_preamble_stuff( ) | | |
| AND/OR | | |
| Other_link_layer_stuff( ) | | |
| { | | |
| partial_time_present | 1 | uimsbf |
| If (partial_time_present) { | | |
| millisecondsPTV | 11 | uimsbf |
| full_time_present | 1 | uimsbf |
| If (full_time_present) | | |
| full_secondsPTV | 32 | uimsbf |

TABLE 9-continued

| Syntax | Bit field | Type |
|---|---|---|
| Else | | |
|     fast_secondsPTV | 6 | uimsbf |
| } | | |
| ... | | |
| } | | |

As illustrated in Table 9, partial_time_present may indicate whether millisecondsPTV is present and full_time_present may indicate whether full_secondsPTV or fast_secondsPTV are present. Based on the example illustrated in FIG. 9 and the example syntax provided in Table 9, transmitting full_secondsPTV at 1 Hz, fast_secondsPTV at 10 Hz and millisecondsPTV at 10 Hz provides a time value every 100 ms and has a data channel requirement of 222 bps. That is, 32 bps for full_secondsPTV at 1 Hz, 60 bps for fast_secondsPTV at 10 Hz, 110 bps millisecondsPTV at 10 Hz, and 20 bps for signaling elements partial_time_present and full_time_present.

In another example, syntax elements based on an assumption that time is signaled in the preamble of physical frames in pre-defined pattern (e.g., sent in every other data frame, or sent in every 3rd data frame, etc.) may be used to indicate whether one or more of full_secondsPTV, fast_secondsPTV, and millisecondsPTV are present. In one example, as illustrated in Table 10 a single bit (i.e., TimeFormat) may be used to signal whether a partial time (i.e., millisecondsPTV and fast_secondsPTV) or a full time (i.e., millisecondsPTV and full_secondsPTV) is present.

TABLE 10

| Syntax | Bit field | Type |
|---|---|---|
| Other_preamble_stuff( ) | | |
| AND/OR | | |
| Other_link_layer_stuff( ) | | |
| { | | |
|     TimeFormat | 1 | uimsbf |
|     millisecondsPTV | 11 | uimsbf |
|     If (TimeFormat == 1) | | |
|         full_secondsPTV | 32 | uimsbf |
|     Else | | |
|         fast_secondsPTV | 6 | uimsbf |
|     ... | | |
| } | | |

Based on the example illustrated in FIG. 9 and the example syntax provided in Table 10, transmitting full_secondsPTV at 1 Hz, fast_secondsPTV at 10 Hz and millisecondsPTV at 10 Hz provides a time value every 100 ms and has a data channel requirement of 212 bps. That is, 32 bps for full_secondsPTV at 1 Hz, 60 bps for fast_secondsPTV at 10 Hz, 110 bps millisecondsPTV at 10 Hz, and 10 bps for signaling element TimeFormat.

As described above, a link layer may support the encapsulation of MPEG-TS network packets. MPEG-TS includes time values. In one example, a 1-bit field (e.g., included in a physical frame preamble) may be used to indicate a MPEG-TS mode. When the 1-bit field indicates an MPEG-TS, a syntax element, e.g., Num_TS_in_frame, in the physical frame preamble may provide a number of MPEG-TS type link layer packets included in a frame and for each MPEG-TS type link layer packets a slowPTV value indicating an 8-bit GPS_UTC_offset and a partial time value indicating a 32-bit system_time may be included. In one example, GPS_UTC_offset may define the current offset in whole seconds between Global Positioning Systems (GPS) standards, which may reference time to the Master Clock at the United States Naval Observatory, and UTC time standards. In one example, GPS_UTC_offset may include an 8-bit unsigned integer that defines the curreNt offset in whole seconds between GPS and UTC time standards. In one example, system_time may include a 32-bit unsigned integer quantity representing the current system_time as the number of seconds since 00:00:00 UTC, Jan. 6, 1980. In this manner, television service provider site 106 may be configured to signal one or more partial time values at different points in a physical frame (e.g., at different layers) and/or in different frames. In one example, each of the a partial time value indicating an 8-bit GPS_UTC_offset and partial time value indicating a 32-bit system_time may be combined with one or more other PTV values (e.g., a nanosecond partial time in a frame preamble) to generate a system_time. Further, when the 8-bit GPS_UTC_offset and the 32-bit system_time are not present in the MPEG-TS, they may be included as partial time value indicating an 8-bit GPS_UTC_offset and the partial time value indicating a 32-bit system_time in a physical frame preamble and/or link layer.

Figure 10:
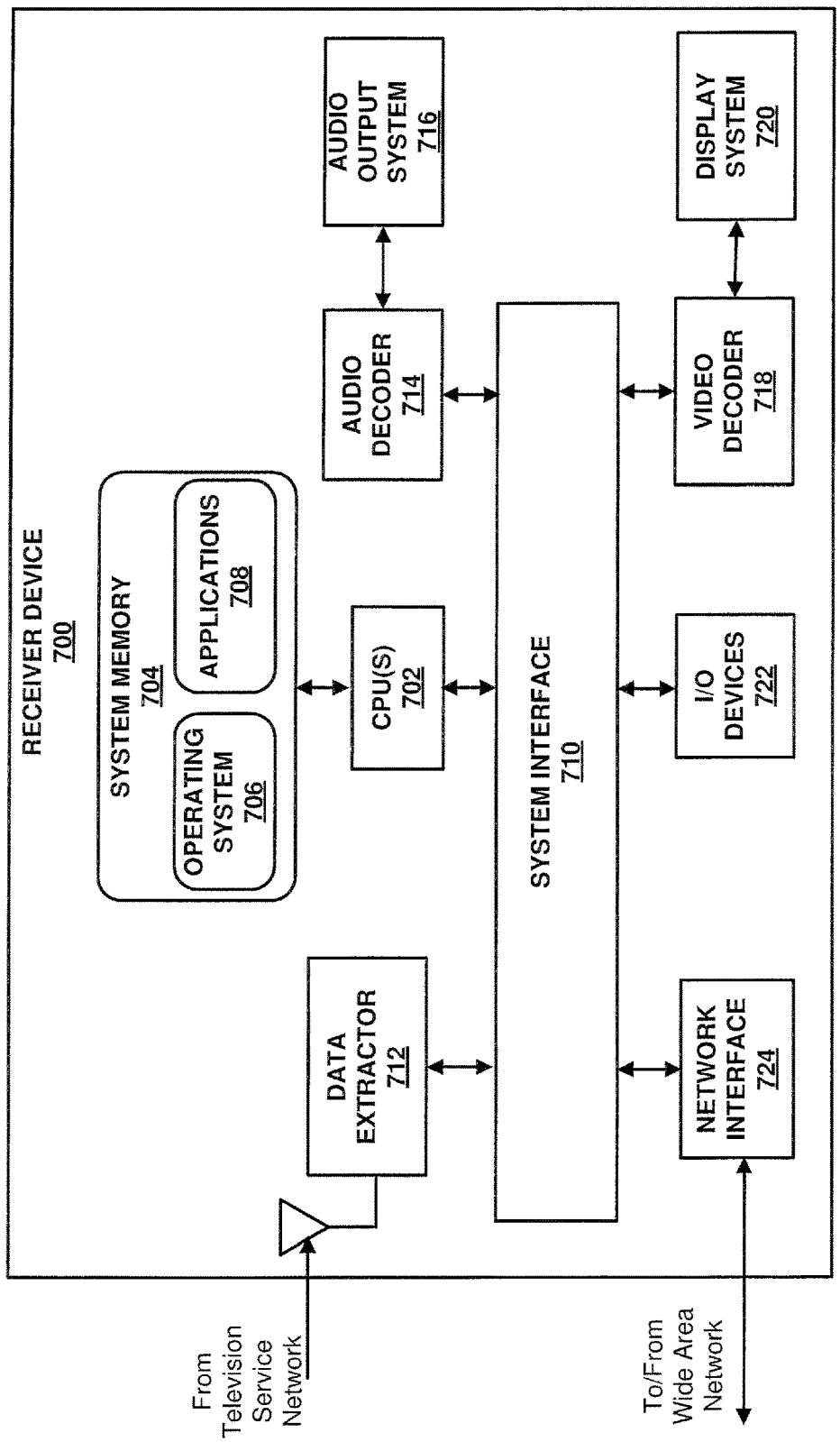
FIG. 10 is a block diagram illustrating an example of a receiver device that may implement one or more techniques of this disclosure.

FIG. 10 is a block diagram illustrating an example of a receiver device that may implement one or more techniques of this disclosure. Receiver device 700 is an example of a computing device that may be configured to receive data from a communications network and allow a user to access multimedia content. In the example illustrated in FIG. 10, receiver device 700 is configured to receive data via a television network, such as, for example, television service network 104 described above. Further, in the example illustrated in FIG. 10, receiver device 700 is configured to send and receive data via a wide area network. It should be noted that in other examples, receiver device 700 may be configured to simply receive data through a television service network 104. The techniques described herein may be utilized by devices configured to communicate using any and all combinations of communications networks.

As illustrated in FIG. 10, receiver device 700 includes central processing unit(s) 702, system memory 704, system interface 710, data extractor 712, audio decoder 714, audio output system 716, video decoder 718, display system 720, I/O devices 722, and network interface 724. As illustrated in FIG. 10, system memory 704 includes operating system 706 and applications 708. Each of CPU(s) 702, system memory 704, system interface 710, data extractor 712, audio decoder 714, audio output system 716, video decoder 718, display system 720, I/O devices 722, and network interface 724 may be interconnected (physically, communicatively, and/or operatively) for inter-component communications and may be implemented as any of a variety of suitable circuitry, such as one or more microprocessors, DSPs, ASICs, FPGAs, discrete logic, software, hardware, firmware or any combinations thereof. It should be noted that although example receiver device 700 is illustrated as having distinct functional blocks, such an illustration is for descriptive purposes and does not limit receiver device 700 to a particular hardware architecture. Functions of receiver device 700 may be realized using any combination of hardware, firmware and/or software implementations.

CPU(s) 702 may be configured to implement functionality and/or process instructions for execution in receiver device 700. CPU(s) 702 may include single and/or multi-core central processing units. CPU(s) 702 may be capable of retrieving and processing instructions, code, and/or data structures for implementing one or more of the techniques described herein. Instructions may be stored on a computer readable medium, such as system memory 704.

System memory 704 may be described as a non-transitory or tangible computer-readable storage medium. In some examples, system memory 704 may provide temporary and/or long-term storage. In some examples, system memory 704 or portions thereof may be described as non-volatile memory and in other examples portions of system memory 704 may be described as volatile memory. System memory 704 may be configured to store information that may be used by receiver device 700 during operation. System memory 704 may be used to store program instructions for execution by CPU(s) 702 and may be used by programs running on receiver device 700 to temporarily store information during program execution. Further, in the example where receiver device 700 is included as part of a digital video recorder, system memory 704 may be configured to store numerous video files. Further, system memory 704 may include one or more registers, which may be used in chip-to-chip data transfer and communication. In one example, an 80-bit PTP value may be stored as an internal array of registers. As different PTVs arrive at receiver device 700, the PTVs may be loaded into different parts of the 80-bit array of registers. Other components of receiver device 700 may be configured to read off the entire, or parts thereof, 80-bit PTP as the system clock.

Applications 708 may include applications implemented within or executed by receiver device 700 and may be implemented or contained within, operable by, executed by, and/or be operatively/communicatively coupled to components of receiver device 700. Applications 708 may include instructions that may cause CPU(s) 702 of receiver device 700 to perform particular functions. Applications 708 may include algorithms which are expressed in computer programming statements, such as, for-loops, while-loops, if-statements, do-loops, etc. Applications 708 may be developed using a specified programming language. Examples of programming languages include, Java™, Jini™, C, C++, Objective C, Swift, Perl, Python, PhP, UNIX Shell, Visual Basic, and Visual Basic Script. In the example where receiver device 700 includes a smart television, applications may be developed by a television manufacturer or a broadcaster. As illustrated in FIG. 10, applications 708 may execute in conjunction with operating system 706. That is, operating system 706 may be configured to facilitate the interaction of applications 708 with CPUs(s) 702, and other hardware components of receiver device 700. Operating system 706 may be an operating system designed to be installed on set-top boxes, digital video recorders, televisions, and the like. It should be noted that techniques described herein may be utilized by devices configured to operate using any and all combinations of software architectures.

System interface 710 may be configured to enable communications between components of receiver device 700. In one example, system interface 710 comprises structures that enable data to be transferred from one peer device to another peer device or to a storage medium. For example, system interface 710 may include a chipset supporting Accelerated Graphics Port (AGP) based protocols, Peripheral Component Interconnect (PCI) bus based protocols, such as, for example, the PCI Express™ (PCIe) bus specification, which is maintained by the PCI Special Interest Group, or any other form of structure that may be used to interconnect peer devices (e.g., proprietary bus protocols).

As described above, receiver device 700 is configured to receive and, optionally, send data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 7, data extractor 712 may be configured to extract video, audio, and data from a signal. A signal may be defined according to, for example, aspects DVB standards, ATSC standards, ISDB standards, DTMB standards, DMB standards, and DOCSIS standards.

Figure 11:
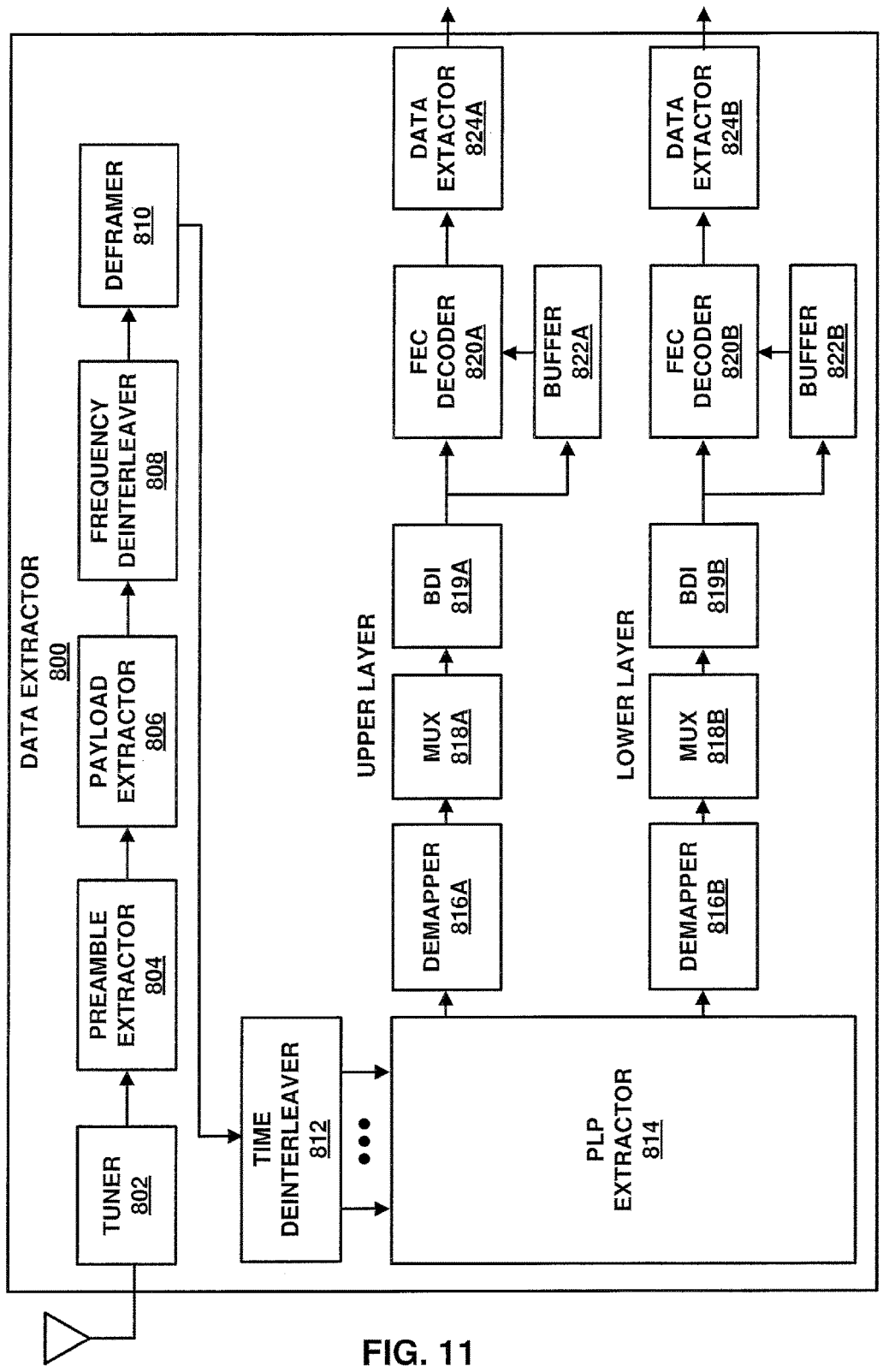
FIG. 11 is a block diagram illustrating an example of a data extractor that may implement one or more techniques of this disclosure.

Data extractor 712 may be configured to extract video, audio, and data, including emergency alert service messages from a signal generated by service distribution engine 200 described above. That is, data extractor 712 may operate in a reciprocal manner to service distribution engine 200. FIG. 11 is a block diagram illustrating an example of a data extractor that may implement one or more techniques of this disclosure. Data extractor 800 may be configured to parse a signal including PTVs. In the example illustrated in FIG. 11, data extractor 800 includes tuner 802, preamble extractor 804, payload extractor 806, frequency deinterleaver 808, deframer 810, time deinterleaver 812 and PLP extractor 814. Further, in the example illustrated in FIG. 11, data extractor 800 includes respective demappers 816A-816B, multiplexers 818A-818B, bit deinterleavers (BDI) 819A-819B, FEC decoders 820A-820B, buffers 822A-822B, and data extractors 824A-824B corresponding to an upper Layer Layered Division Multiplexing (LDM) layer and a lower LDM layer.

Tuner 802 may be configured to tune to an RF channel (e.g., a 6 MHz). It should be noted that tuner 802 may be configured to enter a waveform by tuning to a bootstrap (e.g., a 4.5 MHz bootstrap). Tuner 802 may be configured to extract symbols from a bootstrap. As described above a bootstrap enable discovery, synchronization, frequency offset estimation, and initial channel estimation. Further, as described above, a bootstrap signal may provide an indications a system time. Preamble extractor 804 may be configured to extract a preamble of physical layer frame.

Payload extractor 806 may be configured to extract a payload from a physical layer frame. As described above, a payload may include PLPs and PLPs may include a data stream including emergency service message data streams. Frequency deinterleaver 808 may be configured to perform frequency deinterleaving in a reciprocal manner to frequency interleaving techniques performed by frequency interleaver 406 described above. Deframer 810 may be configured to receive symbols arranged in frames generated by frame generator 404 described above and perform deframing techniques to extract cells. Time deinterleaver 812 may be configured to perform time deinterleaving in a reciprocal manner to time interleaving techniques performed by time interleaver 402 described above. PLP extractor 814 may be configured to extract PLP cells.

For each respective layer, demappers 816A-816B may be configured to map constellations defined according to a modulation scheme to a sub-streams of bits. Multiplexers 818A-818B may be configured to multiplex sub-streams of bits into a stream of bits. BDI 819A-819B may be configured to perform bit deinterleaving in a reciprocal manner to bit interleaving techniques performed by service distribution engine 200. In this manner, FEC decoders 820A-820B may receive a one or more FEC frames forming a PLP. Data extractors 824A-824B may be configured to provide data packets, e.g., packets include audio, video, and message to system interface 710.

Referring again to FIG. 11, data packets may be processed by CPU(s) 702, audio decoder 714, and video decoder 718. Audio decoder 714 may be configured to receive and process audio packets. Audio decoder 714 may cause audio content associated with an emergency alert messaged to be rendered. For example, audio decoder 714 may include a combination of hardware and software configured to implement aspects of an audio codec. That is, audio decoder 714 may be configured to receive audio packets and provide audio data to audio output system 716 for rendering. Audio data may be coded using multi-channel formats such as those developed by Dolby and Digital Theater Systems. Audio data may be coded using an audio compression format. Examples of audio compression formats include MPEG formats, Advanced Audio Coding (AAC) formats, DTS-HD formats, and AC-3 formats. Audio output system 716 may be configured to render audio data. For example, audio output system 716 may include an audio processor, a digital-to-analog converter, an amplifier, and a speaker system. A speaker system may include any of a variety of speaker systems, such as headphones, an integrated stereo speaker system, a multi-speaker system, or a surround sound system.

Video decoder 718 may be configured to receive and process video packets. For example, video decoder 718 may include a combination of hardware and software used to implement aspects of a video codec. In one example, video decoder 718 may be configured to decode video data encoded according to any number of video compression standards, such as ITU-T H.262 or ISO/IEC MPEG-2 Visual, ISO/IEC MPEG-4 Visual, ITU-T H.264 (also known as ISO/IEC MPEG-4 AVC), and High-Efficiency Video Coding (HEVC). Display system 720 may be configured to retrieve and process video data for display. For example, display system 720 may receive pixel data from video decoder 718 and output data for visual presentation. Further, display system 720 may be configured to output graphics in conjunction with video data, e.g., graphical user interfaces. For example, display system 720 may be configured to cause images and text associated with an emergency alert message to be presented to a user (e.g., cause a weather map to appear on a display and/or cause scrolling text to appear on a display). Display system 720 may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content.

I/O device(s) 722 may be configured to receive input and provide output during operation of receiver device 700. That is, I/O device(s) 722 may enable a user to select multimedia content to be rendered. Input may be generated from an input device, such as, for example, a push-button remote control, a device including a touch-sensitive screen, a motion-based input device, an audio-based input device, or any other type of device configured to receive user input. I/O device(s) 722 may be operatively coupled to receiver device 700 using a standardized communication protocol, such as for example, Universal Serial Bus (USB) protocol, Bluetooth, ZigBee or a proprietary communications protocol, such as, for example, a proprietary infrared communications protocol.

Network interface 724 may be configured to enable receiver device 700 to send and receive data via a local area network and/or a wide area network. Network interface 724 may include a network interface card, such as an Ethernet card, an optical transceiver, a RF transceiver, or any other type of device configured to send and receive information. Network interface 724 may be configured to perform physical signaling, addressing, and channel access control according to the physical and Media Access Control (MAC) layers utilized in a network. As described above, an emergency alert message may include a URL. Network interface 724 may enable receiver device to access information associated with a URL. It should be noted that although the techniques are described with respect to emergency alert messages, the techniques described herein may be generally applicable to any type of message (e.g., XML interactive advertising content) that may be received by receiver device 700.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application-tion integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A method of signaling a system time, the method comprising:
    signaling a system time at a mark associated with a physical layer frame as a value indicating a duration since an epoch using a plurality of different partial time values that is used to reconstruct the system time to a particular precision,
    wherein the plurality of different partial time values include a seconds partial time value, a millisecond partial time value, a microsecond partial time value, and a nanosecond partial time value; and
    signaling a syntax element indicating whether zero or more partial time values are present in a preamble of the physical layer frame.

2. The method of claim 1, wherein a seconds partial time value includes a 32-bit value representing epoch seconds at the mark.

3. The method of claim 1, further comprising transmitting a physical layer frame including the seconds partial time value at least every five seconds.

4. The method of claim 1, wherein a millisecond partial time value provides values for 10 bits of a 32-bit precision time protocol nanosecond field.

5. The method of claim 1, wherein a mark includes an emission time of a first symbol included in a bootstrap of the physical frame.

6. A device for signaling a system time, the device comprising one or more processors configured to:
    signal a system time at a mark associated with a physical layer frame as a value indicating a duration since an epoch using a plurality of different partial time values that is used to reconstruct the system time to a particular precision,
    wherein the plurality of different partial time values include a seconds partial time value, a millisecond partial time value, a microsecond partial time value, and a nanosecond partial time value; and
    signal a syntax element indicating whether zero or more partial time values are present in a preamble of the physical layer frame.

7. The device of claim 6, wherein a seconds partial time value includes a 32-bit value representing epoch seconds at the mark.

8. The device of claim 6, wherein the one or more processors are further configured to transmit a physical layer frame including the seconds partial time value at least every five seconds.

9. The device of claim 6, wherein a millisecond partial time value provides values for 10 bits of a 32-bit precision time protocol nanosecond field.

10. The device of claim 6, wherein a mark includes an emission time of a first symbol included in a bootstrap of the physical frame.

11. A method of constructing a system time, the method comprising:
    parsing a syntax element indicating whether zero or more partial time values are present in a preamble of the physical layer frame;
    parsing a plurality of different partial time values present in the preamble, wherein the plurality of different partial time values include a seconds partial time value, a millisecond partial time value, a microsecond partial time value, and a nanosecond partial time value; and
    constructing a system time at a mark associated with the physical layer frame as a value indicating a duration since an epoch using the plurality of different partial time values.

12. The method of claim 11, wherein a seconds partial time value includes a 32-bit value representing epoch seconds at the mark.

13. The method of claim 11, wherein a millisecond partial time value provides values for 10 bits of a 32-bit precision time protocol nanosecond field.

14. The method of claim 11, wherein a mark includes an emission time of a first symbol included in a bootstrap of the physical frame.

15. The method of claim 11, further comprising aligning one or more application events to the system time.

16. A device for constructing a system time device comprising one or more processors configured to:
    parse a syntax element indicating whether zero or more partial time values are present in a preamble of the physical layer frame;
    parse a plurality of different partial time values present in the preamble, wherein the plurality of different partial time values include a seconds partial time value, a millisecond partial time value, a microsecond partial time value, and a nanosecond partial time value; and
    construct a system time at a mark associated with the physical layer frame as a value indicating a duration since an epoch using the plurality of different partial time values.

17. The device of claim 16, wherein a seconds partial time value includes a 32-bit value representing epoch seconds at the mark.

18. The device of claim 16, wherein a millisecond partial time value provides values for 10 bits of a 32-bit precision time protocol nanosecond field.

19. The device of claim 16, wherein a mark includes an emission time of a first symbol included in a bootstrap of the physical frame.

20. The device of claim 16, wherein the one or more processors are further configured to align one or more application events to the system time.

* * * * *